R. C. KELLEY.
Coat-Supporter.
No. 84,495.  Patented Dec. 1, 1868.
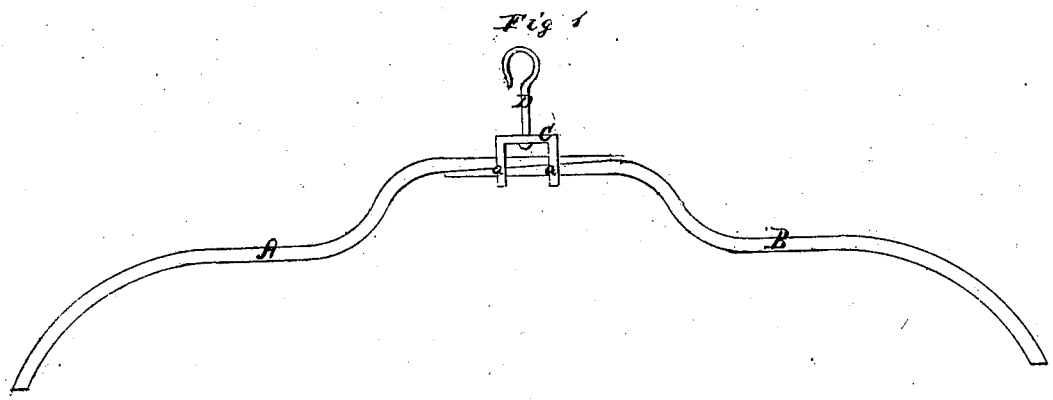
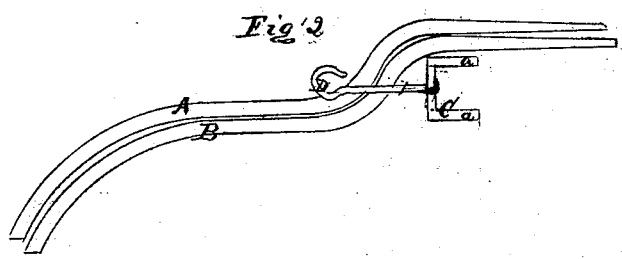
Witnesses
A. C. Shepard
E. Case
Robert C. Kelley
by his attorney Smith & Jaupre

ROBERT C. KELLY, OF WEST MERIDEN, CONNECTICUT.

Letters Patent No. 84,495, dated December 1, 1868.

IMPROVED COAT-SUPPORT.

The Schedule referred to in these Letters Patent and making part of the same.

*To all whom it may concern:*

Be it known that I, ROBERT C. KELLY, of West Meriden, county of New Haven, and State of Connecticut, have invented a new and useful Improvement in Coat-Supporters; and I do hereby declare the following to be a full, clear, and exact description of the same, reference being had to the accompanying drawings, and to the letters of reference marked thereon. Said drawings constitute part of this specification, and represent, in—

Figure 1, a side view of my improvement, showing the two arms together, ready for use, and in Figure 2, the arms detached and folded for packing.

Similar letters of reference, when they occur in the separate views, indicate like parts.

My invention relates to an improvement in coat-supporters, such as are used to hang coats upon, to prevent them from being drawn out of shape, and consists in making the said supporter from two pieces of wire, bent in the proper shape, the two ends of which are firmly held together by a convenient device arranged for that purpose.

The object of this invention is to make a coat-supporter which may be readily taken apart, and packed in a very small compass, thus having the advantage over those in common use, which, although they do not take up much room of themselves, are very inconvenient to pack, on account of the length and curve of the wire of which they are made.

To enable others skilled in the art to make and use my improvement, I will proceed to describe the same.

A and B are the two arms of the supporter, made in separate pieces, from wire of the requisite size, and with the proper curve, so that when they are together, as shown in fig. 1, they will fit the shoulders of the coat.

The inner ends of these arms are made slightly wedge-shape, in order that they may better fit the slot in the connection C. Said connection is made from a small straight piece of sheet-metal, with its ends bent downwards, thus forming the ears $a\ a$. Through these said ears a slot is mortised, the length of the said slot being less than twice the diameter of one of the arms, the width thereof being the same as that of the arms. Through this said slot the arms A and B are inserted from each side, each arm passing through the slot in both of the ears $a\ a$, and lapping by each other until their wedge-shaped ends have thrown them outward sufficiently to cause them to come in contact with the metal at the upper and lower end of the slot in the ears $a\ a$. The arms are in this way held together as firmly as if made from one continuous piece of wire.

Through the upper portion of the connection C a hook, D, is placed, for the convenience of hanging the supporter, when the coat is upon it.

When required to be packed, the arms can easily be drawn from the connection C, and laid side by side, in which position they can be placed in a common-sized travelling-bag, which could by no means be done with a supporter made entirely from one piece of wire.

Having thus fully described my invention,

What I claim as new and useful, and desire to secure by Letters Patent, is—

The within-described coat-supporter, as a new article of manufacture, consisting of the arms A and B, and the slotted connection C.

ROBERT C. KELLY.

Witnesses:
GEO. W. SMITH,
RUFUS H. SANFORD.